(12) United States Patent
Brady (10) Patent No.: US 10,097,729 B1
(45) Date of Patent: Oct. 9, 2018

(54) TECHNIQUES AND METHODS FOR INTEGRATING A PERSONAL ASSISTANT PLATFORM WITH A SECURED IMAGING SYSTEM

(71) Applicant: CANON KABUSHIKI KAISHA, Tokyo (JP)

(72) Inventor: Nigel Brady, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/799,697

(22) Filed: Oct. 31, 2017

(51) Int. Cl.
*H04N 1/44* (2006.01)
*H04N 1/00* (2006.01)

(52) U.S. Cl.
CPC ....... *H04N 1/4426* (2013.01); *H04N 1/00344* (2013.01); *H04N 1/00403* (2013.01); *H04N 1/4413* (2013.01); *H04N 1/4433* (2013.01); *H04N 2201/0094* (2013.01)

(58) Field of Classification Search
CPC .. H04N 1/4426; H04N 1/4413; H04N 1/4433; H04N 1/00403; H04N 1/00344; H04N 2201/0094
See application file for complete search history.

(56) References Cited

U.S. PATENT DOCUMENTS

| | | | |
|---|---|---|---|
| 6,253,184 B1 | 6/2001 | Ruppert | |
| 8,340,975 B1 | 12/2012 | Rosenberger | |
| 8,462,367 B2 | 6/2013 | Burke et al. | |
| 8,510,115 B2 | 8/2013 | Sawano | |
| 9,286,899 B1 | 3/2016 | Narayanan | |
| 9,363,372 B2 | 6/2016 | Wu et al. | |
| 9,384,751 B2 | 7/2016 | Venkatesha et al. | |
| 9,406,300 B2 | 8/2016 | Himmelstein | |
| 9,431,014 B2 | 8/2016 | Wait | |
| 9,472,205 B2 | 10/2016 | Kolavennu et al. | |
| 2002/0184302 A1* | 12/2002 | Prueitt | G06Q 30/02 709/203 |
| 2006/0176504 A1* | 8/2006 | Burke | G06F 3/1206 358/1.15 |
| 2006/0200850 A1* | 9/2006 | Yoshizawa | H04L 61/106 725/110 |
| 2006/0227946 A1 | 10/2006 | Henderson | |

(Continued)

*Primary Examiner* — Kent Yip
(74) *Attorney, Agent, or Firm* — Canon U.S.A., Inc. IP Division (57) ABSTRACT

A system and method provides features for accessing an image processing device by an authorized user and assigning a temporary identifier to the image processing device. The image processing device creates mapping information that associates the authorized user, the temporary identifier and a network address of the image processing device, and stores the mapping information on a server. The user provides voice input commands to a personal assistant application, the voice input commands including the temporary identifier of the image processing device and a requested job functions of the image processing device. The server receives and interprets the voice input commands from the personal assistant application and determines, by recalling the mapping information stored, verifying whether the image processing device having the temporary identifier is available to perform the requested job functions. The image processing device receives instructions to perform the requested job functions and executes the requested job functions.

15 Claims, 8 Drawing Sheets

(56) References Cited

U.S. PATENT DOCUMENTS

| | | | | |
|---|---|---|---|---|
| 2010/0286985 A1* | 11/2010 | Kennewick | ............ | G10L 15/22 |
| | | | | 704/257 |
| 2014/0240748 A1 | 8/2014 | Ohno | | |
| 2015/0088518 A1* | 3/2015 | Kim | ........................ | G06F 3/167 |
| | | | | 704/251 |
| 2016/0171980 A1 | 6/2016 | Liddell et al. | | |

* cited by examiner

TECHNIQUES AND METHODS FOR INTEGRATING A PERSONAL ASSISTANT PLATFORM WITH A SECURED IMAGING SYSTEM

BACKGROUND OF THE INVENTION

Field of the Invention

The present invention relates generally to a system of controlling an image processing device, and more specifically, techniques and methods for integrating a personal assistant platform with a secured imaging system.

Description of the Related Art

The world of computing is moving beyond the desktop personal computer. With the advent of mobile computing devices such as smartphones, tablets, and wearable devices, users are increasingly interested in using paradigms other than the mouse and keyboard to control these, as well as other connected devices. Voice-driven personal assistant platforms are becoming very popular as means to interact with this ecosystem of connected devices.

It would be useful if voice-driven personal assistant platforms could be used to start and manage imaging jobs (print/scan/fax) on an image processing device. The image processing device may include any one of a multifunction peripheral (MFP), copier, scanner, printer, for providing image processing functions. The image processing device enables a user to execute various functions, features, and user interfaces in order to perform particular task such as making photocopies, printing a document, transmitting data over a network, accessing a database on a remote server, or other task.

However, many image processing devices employ an authentication mechanism to prevent unauthorized use of the image processing device. Authentication may include prompting the user to provide a credential in order to log in to the image processing device. The authentication may be based on a username and password, a smart card, a personal identification number (PIN), or other information associated with the user. Once logged into the image processing device, the user has access to one or more resources of the image processing device.

There are currently no means for these personal assistant platforms to associate the user with the image processing device and to verify that the user is authenticated on the image processing device. A system according to invention principles remedies any drawbacks associated with these conventional systems.

BRIEF SUMMARY OF THE INVENTION

Methods, systems, and computer-readable media for integrating a personal assistant platform with a secured imaging system are described.

An embodiment according to invention principles provides accessing an image processing device by an authorized user, assigning a temporary identifier to the image processing device, creating mapping information that associates the authorized user, the temporary identifier and a network address of the image processing device, transmitting the mapping information to a server for storage and processing, providing voice input commands to a personal assistant application, the voice input commands including the temporary identifier of the image processing device and a requested job function of the image processing device, receiving the voice input commands from the personal assistant application to the server, the server interpreting the voice input commands and determines, by recalling the mapping information stored on the server, verifying whether the image processing device having the temporary identifier is available to perform the job functions, transmitting the instructions to perform the job functions to the image processing device and executing the job functions on the image processing device.

Further features of the present invention will become apparent from the following description of exemplary embodiments with reference to the attached drawings.

DETAILED DESCRIPTION OF THE INVENTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods described herein.

When using voice-driven personal assistant applications (e.g. Apple's 'Siri', Microsoft's 'Cortana', or Amazon's 'Alexa') to perform job functions on an image processing device, a user will have two important concerns. First, the job functions specified in the command must be routed to the user's chosen device. Secondly, the requested job functions must be associated with a particular user account, to enable system administrators to track the image processing device usage.

To address these concerns, the present invention provides a system for accessing an image processing device by an authorized user and assigning a temporary identifier to the image processing device. The image processing device creates mapping information that associates the authorized user, the temporary identifier and a network address of the image processing device. The image processing device transmits the mapping information to a server for storage and processing. The user provides voice input commands to a personal assistant application, the voice input commands including the temporary identifier of the image processing device and the requested job functions of the image processing device. The server receives and interprets the voice input commands from the personal assistant application and determines, by recalling the mapping information stored on the server, whether the image processing device having the temporary identifier is available to perform the job functions. The server transmits the instructions to perform the job functions to the image processing device and the image processing device executes the requested job.

Figure 1:
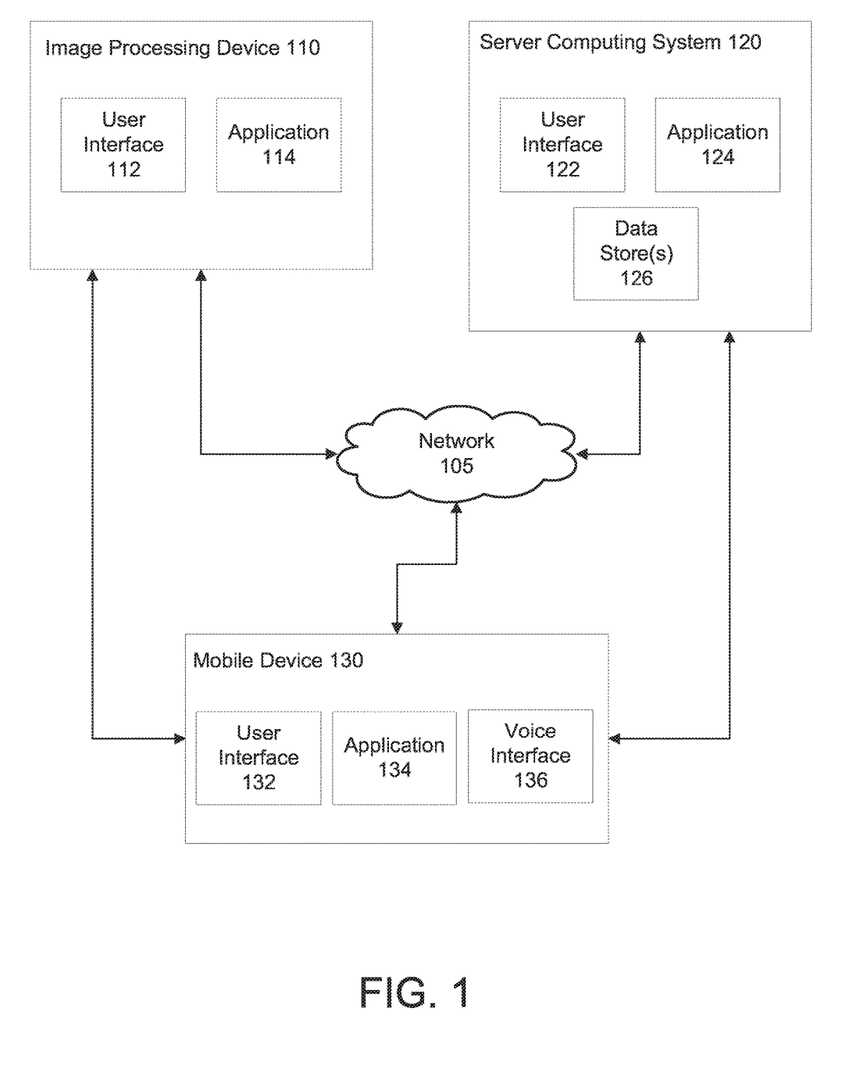
FIG. 1 illustrates an exemplary embodiment of a system for integrating a personal assistant platform with a secured imaging system according to invention principles.

FIG. 1 illustrates an example embodiment of a system for integrating a personal assistant platform with a secured imaging system. FIG. 1 illustrates an example network environment 100 that includes at least one image processing device 110, at least one server 120 controlled by a manufacturer of the at least one image processing device 110 and at least one mobile device 130 able to selectively communicate directly or indirectly with the at least one image processing device. Each of the components described herein are interconnected via a communication network 105 enabling one of bidirectional or unidirectional communication there between.

The network 105 that couples the components shown in FIG. 1 may be any suitable network that uses any suitable communication protocol for communicating data between the various components. For example, one or more portions of the network 105 may include an ad hoc network, an intranet, an extranet, a virtual private network (VPN), a local area network (LAN), a wireless LAN (WLAN), a wide are network (WAN), a wireless WAN (WWAN), a metropolitan area network (MAN), a portion of the Internet, a portion of the Public Switched Telephone Network (PSTN), a cellular telephone network, or a combination of two or more of these. The network 105 may include one or more networks. The network 105 may be a wireless communication network, a wired communication network or a combination of both.

While FIG. 1 depicts an image processing device, the following description will reference the components of image processing device 110. However, it should be understood that the description of the components of image processing device is applicable to any other image processing device. The image processing device includes hardware, software, or both for providing the functionality of the image processing device 110. In some embodiments, the image processing device 110 performs one or more steps of one or more methods described or illustrated herein. In some embodiments, the image processing device 110 provides functionality described or illustrated herein. In some embodiments, software running on the image processing device 110 performs one or more steps of one or more methods described or illustrated herein or provide functionality described or illustrated herein.

In some embodiments, the image processing device 110 includes hardware, software, or both for providing scanning functionality. For example, the image processing device 110 may include an image sensor or a camera for capturing an image. In some embodiments, the image processing device 110 scans a physical document to generate electrical signals which are converted to digital image data representing the scanned physical document. The image processing device 110 may convert the digital image data into an electronic document representing the scanned physical document and send the electronic document to a destination.

In some embodiments, the image processing device includes hardware, software, or both for providing printing functionality. For example, the image processing device 110 may selectively receive electronic signals including data generated by one or more applications executing on a computing device (not shown) that is to be output via a printing function. The image processing device 110 may parse the data and control various components of a printing unit to acquire a substrate on which the data is to be printed and cause toner from a toner reservoir to be affixed to the substrate, and output the substrate to the user.

In some embodiments, the image processing device 110 includes hardware, software, or both for providing photocopying or other type of reproduction functionality. The reproduction functionality may include aspects of both the printing and scanning functionality described above whereby an image of an original physical document is captured and the reproduced for output to further physical document.

The image processing device includes the user interface 112. The user interface includes hardware, software, or both for providing the functionality of the user interface 112. The user interface may include an operation panel. The user interface 112 may output signals and receive input signals via the operation panel so as to facilitate interaction between a user and the image processing device 110. An operation panel may include a hard key panel and/or a touch sensitive display. A user may provide user input operations via the hard key panel and/or the touch sensitive display to control the image processing device 110 via the operation panel. For example, the user may press one or more hard buttons to issue one or more commands. Another example, a user may provide a touch input to an interface element displayed on the display to issue a command and/or to make a selection. As a further example, the image processing device 110 may output information to the user and issue requests by outputting images on a display.

In some embodiments, a browser may execute on the image processing device 110. In some embodiments, the user interface 112 comprises information displayed by the browser. The browser may be a web browser such as Microsoft Internet Explorer or Mozilla Firefox, and maybe used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser. The image processing device 110 may have various add-ons, plug-ins, or other extensions for use in or with the browser.

The image processing device may include at least one application 114 comprising programs and related data. The application 114 may include a set of instructions representing one or more algorithms that are stored in a memory, storage device and/or computer-readable storage medium that are selectively executed by a processor which loads the set of instructions into active memory to perform the functionality detailed in the algorithm. In some embodiments, the application 114 executing on the image processing device 110 performs one or more steps of one or more methods described or illustrated herein or provides functionality described or illustrated herein. By way of example and not by way of limitation, programs of the application 114 may include instructions which, when executed by one or more processors, cause the one or more processors to perform one or more operations described with respect to FIG. 4.

In some embodiments, the application 114 executing on the image processing device 110 provides functionality for maintaining and accessing information in a data structure, which may be any suitable data structure for organizing data. For example, information associated with a user or process may be added as one or more entries into a data structure. The application 114 executing on the image processing device 110 may store and/or retrieve data in a memory or on a hard disk of the image processing device 110. In some embodiments, the image processing device 110, when executing the application 114, may perform various data store. Examples of operations include adding entries to a data store, deleting entries from a data store, modifying entries in a data store, searching for entries in a data store, and retrieving entries from a data store.

The application 114 executing on the image processing device 110 may provide functionality for generating information and providing the information to the user interface 112 of the image processing device 110. The information may include text, images, form elements, files, executable programs, or other suitable information. The information provided by the application 114 may include content for display on a display of the image processing device 110.

In some embodiments, the application 114 includes one or more programs for assigning the image processing device 110 a temporary identifier after the user is authorized by the image processing device 110. The temporary identifier is used to identify the image processing device 110 in subsequent voice input commands. The temporary identifier is displayed to the user in their native language and is given a name that is easily pronounceable. For example, in the English language, the term "Walnut" may be a suitable identifier as it is distinct and easily pronounceable. The temporary identifier may be generated locally via an embedded dictionary of suitable words, or may be requested from an external source, such as server 120. The temporary identifier changes upon job completion to prevent commands from being repeated. In a case of having multiple image processing devices, it may be necessary to query all image processing devices to ensure that no two image processing devices are using the same temporary identifier. After the temporary identifier is assigned to the image processing device 110, mapping information is created which associates the authorized user, the temporary identifier and the current network address of the image processing device 110. The mapping information is uploaded to the server 120 and stored in a memory or on a hard disk of the server 120.

The server 120 includes hardware, software, or both for providing the functionality of the server 120. The server 120 may include one or more servers. For example, the server 120 may include one or more applications servers, authentication servers, web servers, file servers, database servers or mail servers. In some embodiments, the server 120 is unitary. In some embodiments, the server 120 is distributed. The server 120 may span multiple locations. The server 120 may span multiple machines.

The user interface 122 of the server 120 includes hardware, software, or both for providing the functionality of the user interface 122. The user interface 122 may be coupled to output data to a display enabling a user of the server 120 to view information generated, stored or otherwise processed by the server 120. The user interface 112 may output signals and receive input signals via so as to facilitate interaction between a user and the server 120.

In some embodiments, a browser may execute on the server 120. In some embodiments, the user interface 122 comprises information displayed by the browser. The browser may be a web browser such as Microsoft Internet Explorer or Mozilla Firefox, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as JAVA applets, embedded in a web page accessed by the browser. The server 120 may have various add-ons, plug-ins, or other extensions for use in or with the browser.

The server 120 may include at least one application 124 comprising programs and related data. In some embodiments, the application 124 executing on the server 120 performs one or more steps of one or more methods described or illustrated herein or provide functionality described or illustrated herein. By way of example and not by way of limitation, programs of the application 124 may include instructions which, when executed by one or more processors, cause the one or more processors to perform one or more operations described with respect to FIG. 4.

In some embodiments, the application 124 executing on the server 120 provides functionality for maintaining and accessing information in a data structure, which may be any suitable data structure for organizing data. For example, information associated with a user or process may be added as one or more entries into a data structure. The application 124 executing on the server 120 may store and/or retrieve data in a memory or on a hard disk of the server 120. In some embodiments, the server 120, when executing the application 124, may perform various operations with respect to data store 126. Examples of operations include adding entries to a data store 126, deleting entries from a data store 126, modifying entries in a data store 126, searching for entries in a data store 126, and retrieving entries form a data store 126.

A mobile device 130 including a user interface 132, application 134, and a voice interface 136 may also communicate with any one of the components described above in FIG. 1 enabling a user of the mobile device to avail themselves of data generated by the respective components. The voice interface 136 including a multi-language interface for voice input in different languages or dialects where a microphone records voice input by a user, a voice recognition processing to recognize the received voice input according to voice print identification, and performing actions using voice input to allow for device control. The mobile device may be any portable computing device including a laptop, tablet, smartphones, smart speaker, etc.

Figure 2:
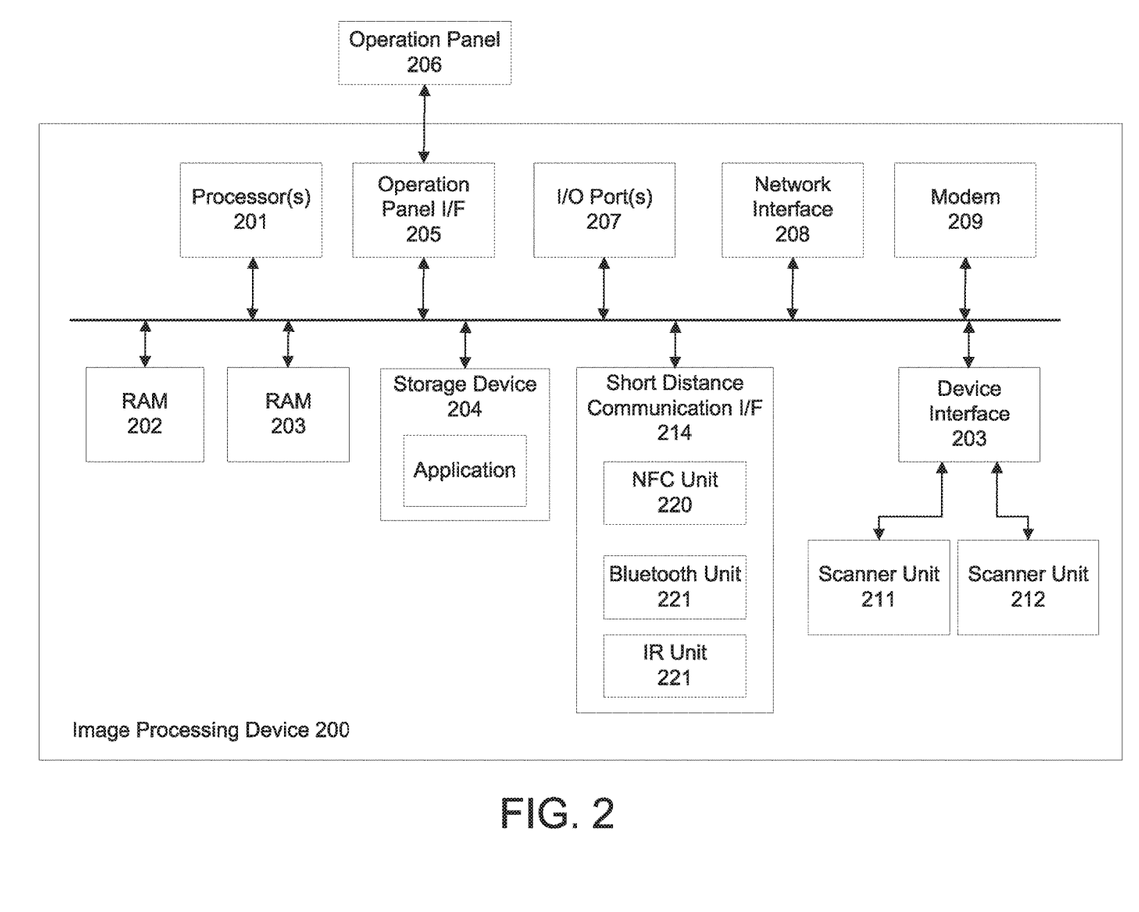
FIG. 2 illustrates a block diagram of an exemplary image processing device according to invention principles.

FIG. 2 illustrates an example image processing device 200. In some embodiments, the image processing device 110 of FIG. 1 comprises the image processing device 200. The image processing device 200 may be a multifunction peripheral having a scanning function in addition to printing, copying and other functions. However, it will be understood that various other implementations of an image processing device are within the scope of the present invention. For example, various components, modules, functions, and/or configurations of the image processing device 200 could be combined, deleted, or modified to form further implementations. In some embodiments, other devices such as a stand-alone scanner, fax machine, or other devices with scanning capabilities and/or computing systems may be implemented as the image processing device 200.

In some embodiments, the image processing device 200 performs one or more operations described herein. In some embodiments, the image processing device 200 provides functionality described herein. In some embodiments, one or more software applications running on the image processing device 110 performs one or more operations described herein. Applications executing on the image processing device 200 and which provide specific types of functionality are in communication with and bidirectional communicate data between the applications executing on the image processing device 200.

The image processing device 200 includes one or more processor(s) 201. The processor(s) 201 include a central processing unit (CPU) that performs overall control functions for the image processing device 200. The CPU uses a random access memory (RAM) 202 as a work area while executing instructions. The CPU executes various instructions of various applications and/or programs stored in one or more memory devices 204. For example, the CPU executes programs stored in read only memory (ROM) 203 and in a storage device 204.

In some embodiments, the processor(s) 201 include one or more processors in addition to the CPU. By way of example, the processor(s) 201 may include one or more general-purpose microprocessor(s), application-specific microprocessor(s), and/or special purpose microprocessor(s). Additionally, in some embodiments the processor(s) 201 may include one or more internal cache for data or instructions.

The processor(s) 201 provide the processing capability required to execute an operating system, application programs, and various other functions provided on the image processing device 200. The processor(s) 201 perform or cause components of the image processing device 200 to perform various operations and processes described herein, in accordance with instructions stored in one or more memory devices 204.

The RAM 202 is used as a work area when the processor(s) 201 execute various instructions, such as those making up computer programs stored in the ROM 203 and/or the storage device 204. The RAM 202 may be used as a temporary storage area for various data, including input image data and data created by an application executing on the image processing device 200 or data received from one or more mobile computing devices 130 which is then further processed by one or more applications executing on the image processing device 200. The RAM 202 may be used as cache memory. In some embodiments, the RAM 202 may be dynamic RAM (DRAM) or static RAM (SRAM).

The ROM 203 stores data and programs having computer-executable instructions for execution by the processor(s) 201. In some embodiments, the ROM 203 is a boot ROM, storing instructions for the booting process. In some embodiments, the ROM 203 may be flash memory. In certain instances, the ROM 203 may include an operating system for controlling the operation of the image processing device 200. In this case, an operating system application stored in ROM 203 (or alternatively stored in the storage device 204 and accessible once the boot routine of the image processing device 200 is completed), contains a catalog of other applications executing on the image processing device 200 and provide information about such other executing applications to one another enabling interoperation there between.

The storage device 204 stores application data, program modules and other information. One or more program modules stored in the storage device 204 are configured to cause various operations and processes described herein to be executed. The storage device 204 also stores other programs and data to be processed. For example, the storage device 204 stores an operating system including programs and data for managing hardware and software components of the image processing device 200. Applications on the image processing device 200 may utilize operating system to perform various operations. The storage device 204 may further store other programs and/or drivers that enable various functions of the image processing device 200, graphical user interface (GUI) functions, and/or processor functions. The storage device 204 may also store data files including, for example, image data, user data, configuration information, GUI components, such as graphical elements or templates, or other data required by the image processing device 200.

In some embodiments, the image processing device 200 includes one or more applications including one or more programs for controlling access to one or more resources on the image processing device 200. In some embodiments, applications stored in the storage device 204 includes one or more programs for controlling access to one or more applications (or particularly functionality thereof) executing on the image processing device 200.

In some embodiments, access to one or more resources of the application is controlled based on credentials associated with the entity attempting to access the one or more resources of the application. Policies for controlling access to various resources of the application may be stored at the image processing device 200. In other embodiments, access control policies may reside in a centralized or enterprise server remotely located from the image processing device 200. Once access to an application is granted, a user gains access to one or more resources of the application, including task-specific functionality of the application. The task-specific functionality of the application may enable the user to perform one or more tasks using the application. For example, the application may provide various functions, features and user interface for processing image data, transmitting data over a network, managing one or more databases, or other task. In some embodiments, the application is configured to use one or more resources of the image processing device 200 to perform a process in response to an instruction from the user.

In some embodiments, the application executing on the image processing device 200 provides communication functionality for transmitting file or other electronic document data file formats via a network to any other computing system and/or server connected thereto. The communication functionality of the application may be implemented by interaction with the network interface 208 which converts data into a transmissible data form able to be communicated over a network 105 to server 120 (or other computing system). In addition to, or stead of using the network interface 109, application functionality that requires transmission of data may be performed using the short distance communication interface 214, including any and all types of short distance communication described herein. The application may also enable the image processing device 200 to receive instruction data from other systems on the network enabling access to and control of any functionality provided by the application. The receipt of data from the server or other computing device may similarly occur using any of the network interface 208, short distance communication interface 214 or the like. The communication functionality of application may also enable the image processing device 200 to receive and process data objects generated by any systems connected to the image processing device 200 via the network 105.

In some embodiments, the application executing on the image processing device 200 provides functionality for maintaining and accessing information in a data structure, which may be any suitable data structure for organizing data. For example, information associated with a user or process may be added as one or more entries into a data structure. The application executing on the image processing device 200 may store and/or retrieve data in a memory or on a hard disk of the image processing device 200. In some embodiments, the image processing device 200, when executing the application, may perform various operations with respect to a data store. Examples of operations include adding entries to a data store, deleting entries from a data store, modifying entries in a data store, searching for entries in a data store, and retrieving entries from a data store. The data store management functionality provided by application discussed above is also applicable to data stores located on remote computing system and/or servers connected to the image processing device 200 via the network 105.

An operation panel interface 205 provides output signals to and receives input signals from an operation panel 206. Regarding the output signals, the operation panel interface 205 provides GUI data to the operation panel 206 for display on a liquid crystal display (LCD). Regarding the input signals, the operation panel interface 205 receives input signals based on user input operations at the operation panel 206 and relays the input signals to the processor(s) 201. In some embodiments, the operation panel 206 includes a touch sensitive element operable to receive user input operations or commands based on the touching of graphical objects displayed on the display. In some embodiments, the operation panel 206 includes a hard key panel.

The image processing device 200 includes one or more input/output (I/O) port(s) 207. The I/O port(s) 207 may include any suitable interface type such as a universal serial bus (USB) port, FireWire port (IEEE-1394), serial port, parallel port, or AC/DC power connection port. The I/O port(s) 207 enable one or more external device(s) 215 to communicate with the image processing device 200 when the external device(s) 215 is/are connected to the I/O port(s) 207. Examples of external devices 215 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 208 includes hardware, software, or both providing one or more interfaces for communication (such as, for example, packet-based communication) between the image processing device 200 and one or more other computing systems or one or more networks 216. As an example and not by way of limitation, the network interface 208 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 216 and any suitable network interface 208 for it. As an example and not by way of limitation, the image processing device 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 216 may be wired or wireless. As an example, the image processing device 200 may communicate with a wireless PAN (WPAN), a WI-FI network, a WI-MAX network, or other suitable wireless network or a combination of two or more of these. The image processing device 200 may include any suitable network interface 208 for any of these networks 216, where appropriate.

A modem 209 modulates/demodulates image data and control signals. The modem 209 is connected to the Public Switched Telephone Network (PSTN) 217 and performs input/output of information between the image processing device 200 and the PSTN 212. By way of example, the modem 209 may send/receive facsimile communications.

The device interface 210 is connected to the scanner unit 211 and to the printer unit 212. The device interface 210 performs synchronous/asynchronous conversion of image data.

The scanner unit 211 includes a light source and an image sensor. The scanner unit 211 may include a glass platen and/or an automatic document feeder (ADF). In operation, the light source illuminates a physical document positioned on the glass platen or fed by the ADF. Light reflected by the physical document reaches the image sensor reaches the image sensor, and the image sensor converts the light into electrical signals. In some embodiments, the scanner unit 211 includes an optical system (for example, mirrors, lens) that directs the light to the image sensor. After the image sensor generates the electrical signals, an analog-to-digital converter converts the electrical signals to digital image data representing the scanned physical document. The scanner unit 211 then outputs the digital image data to one or more other components of the image processing device 200 via the device interface 210.

The printer unit 212 is an image output device for printing on a sheet an image corresponding to image data. In response to a print command received at the image processing device 200, the printer unit 212 receives image data via the device interface 210 and outputs to a sheet an image corresponding to the image data.

The image processing device 200 may also include a short distance communication interface (I/F) 214. The short distance communication interface 214 facilitates communication between one or more applications executing on the image processing device 200 and at least one mobile computing device (not shown) using one or more short distance communication protocols. Thus, the short distance communication I/F 214 includes a near field communication unit 220 (for example, an NFC reader) enabling bidirectional communication with a mobile computing device having NFC functionality. The NFC unit 220 includes circuitry and software that enables transmission (writes) and reception (reads) of commands and data with a non-contract type device using a short distance wireless communication technique such as NFC (Near Field Communication; ISO/IEC IS 18092). In other embodiments, the short distance communication I/F 214 may also include a Bluetooth communication unit 221 that includes a transceiver capable of transmitting and receiving data via short wavelength radio waves ranging in frequency between 2.4 GHz and 2.485 GHz. In other embodiments, the short distance communication I/F 214 may also include an infrared (IR) unit that can emit and sense electromagnetic wavelengths of a predetermined frequency have data encoded therein. Furthermore, while not specifically shown, the short distance communication I/F 214 may also include a smart card reader, radio-frequency identification (RFID) reader, device for detecting biometric information, a keyboard, keypad, sensor(s), a combination of two or more of these, or other suitable devices. In some embodiments, the short distance communication I/F 214 may include an optical scanner configured to capture and scan image data representative of an identification code such as a barcode or a QR code. The capture and processing of a particular identification code may initiate the short distance communication between the mobile computing device 130 and the image processing device 200.

The depiction of the short distance communication I/F 214 is done merely to facilitate the understanding of the operation of the present arrangement and it should be understood that the short distance communication I/F 214 may also be embodied as part of the I/O ports 207 and/or the network interface 208.

A system bus 218 interconnects various components of the image processing device 200 thereby enabling the transmission of data and execution of various processes. The system bus 218 may include one or more types of bus structures including a memory bus or memory controller, a peripheral bus, and a local bus using any of a variety of bus architectures.

Figure 3:
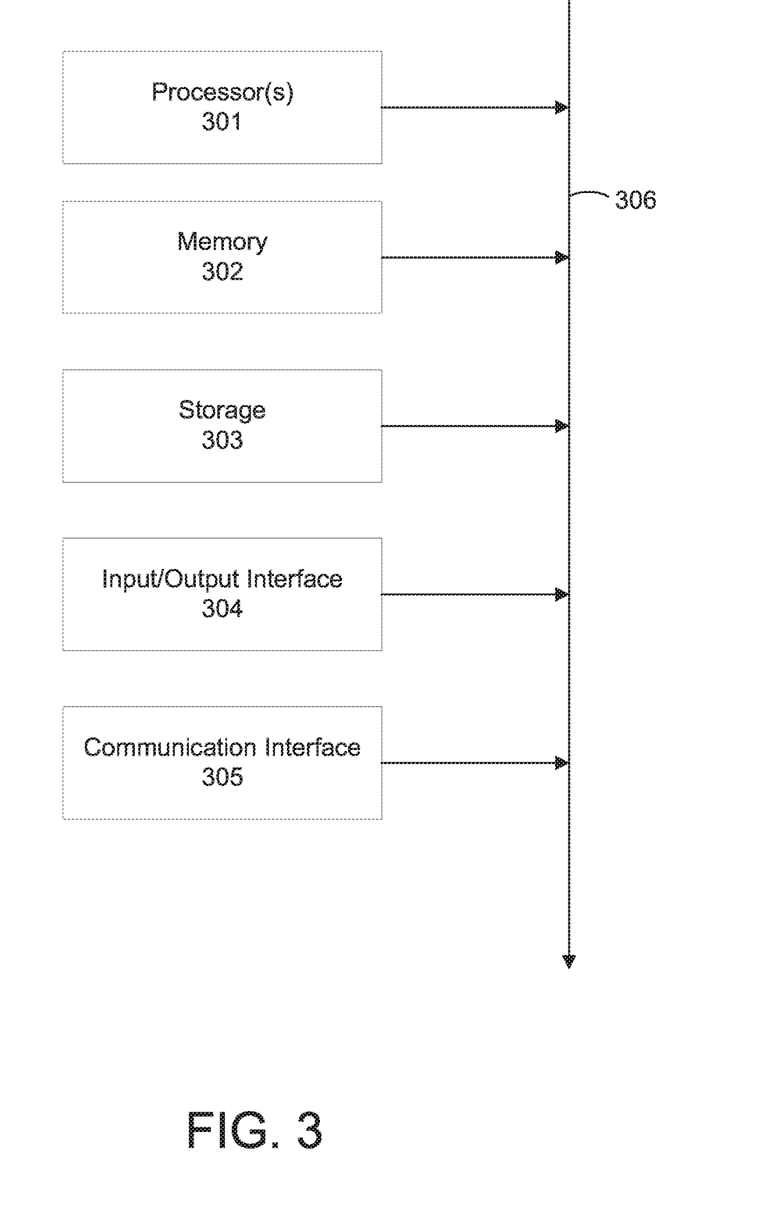
FIG. 3 illustrates a block diagram of an exemplary computing device according to invention principles.

FIG. 3 illustrates an example computing system 300. According to various embodiments, all or a portion of the description of the computing device 300 is applicable to all or portion of one or more of the image processing device 110, the server(s) 120, and the mobile computing device 130.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as memory and processor) work together to perform operations on electronic data. Also, the term resource as used herein includes but is not limited to an object that can be processed at a computing system. A resource can be a portion of executable instructions or data.

In some embodiments, the computing system 300 performs one or more steps of one or more methods described or illustrated herein. In some embodiments, the computing system 300 provides functionality described or illustrated herein. In some embodiments, software running on the computing system 300 performs one or more steps or one or more methods described or illustrated herein or provide functionality described or illustrated herein. Some embodiments include one or more portions of the computing system 300.

The computing system 300 includes one or more processor(s) 301, memory 302, storage 303, an input/output I/O interface 304, a communication interface 305, and a bus 306. The computing system 300 may take any suitable physical form. For example, and not by way of limitation, the computing system 300 may be an embedded computer system, a system-on-chip (SOC), a single-board computing system (SBC), (such as, for example, s computer-on-module (COM) or system-on-module (SCM)), a desktop computing system, a laptop or notebook computer system, and interactive kiosk, a mainframe, a mesh of computers, a mobile telephone, PDA, a server, a tablet computer system, a smart speaker, or a combination of two or more of these.

The processor(s) 301 include hardware for executing instructions, such as those making up a computer program. The processor(s) 301 may retrieve the instructions from the memory 302, the storage 303, an internal register, or an internal cache. The processor(s) 301 then decode and execute the instructions. Then, the processor(s) 301 write one or more results to the memory 302, the storage 303, the internal register, or the internal cache. The processor(s) 301 may provide the processing capability to execute the operation system, programs, user and application interfaces, and any other functions of the computing system 300.

The processor(s) 301 may include a central processing unit (CPU), one or more general-purpose microprocessor(s), application-specific microprocessor(s), and/or special purpose microprocessor(s), or some combination of such processing components. The processor(s) 301 may include one or more graphics processor, video processors, audio processors and/or related chip sets.

In some embodiments, the memory 302 includes main memory for storing instructions for the processor(s) 301 to execute or data for the processor(s) 301 to operate on. By way of example, the computing system 300 may load instructions from the storage 303 or another source to the memory 302. During or after execution of the instruction, the processor (s) 301 may write one or more results (which may be intermediate or final results) to the memory 302. One or more memory buses (which may each include an address bus and a data bus) may couple the processor(s) 301 to the memory 302. One or more memory management units (MMUs) may reside between the processor(s) 301 and the memory 302 and facilitate accesses to the memory 302 requested by the processor(s) 301. The memory 302 may include one or more memories. The memory 302 may be random access memory (RAM).

The storage 303 stores data and/or instructions. As an example and not by way of limitations, the storage 303 may include a hard disk drive, a floppy disk drive, flash memory, an optical disc, a magneto-optical disc, magnetic tape, or a Universal Serial Bus (USB) drive or a combination of two or more of these. In some embodiments, the storage 303 is removable medium. In some embodiments, the storage 303 is a fixed medium. In some embodiments, the storage 303 is internal to the computing system 300. In some embodiments, the storage 303 is external to the computing system 300. In some embodiments, the storage 303 is non-volatile, solid state memory. In some embodiments, the storage 303 includes read-only memory (ROM). Where appropriate, this ROM may be masked-programmed ROM, programmable ROM (PROM), erasable PROM (EPROM), electrically erasable PROM (EEPROM), electrically alterable ROM (EAROM), or flash memory or a combination of two or more of these. The storage 303 may include one or more memory devices. One or more program modules stored in the storage 303 may be configured to cause various operations and processes described herein to be executed.

The I/O interface 304 includes hardware, software, or both providing one or more interfaces for communication between the computing system 300 and one or more I/O devices. The computing system 300 may include one or more of these I/O devices, where appropriate. One or more of these I/O devices may enable communication between a person and the computing system 300. As an example and not bay of limitation, an I/O device may include a keyboard, keypad, microphone, monitor, mouse, speaker still camera, stylus, tablet, touch screen, trackball, video camera, another suitable I/O device or a combination of two or more of these. An I/O device may include one or more sensors. In some embodiments, the I/O interface 304 includes one or more device or software driers enabling the processor(s) 301 to drive one or more of these I/O devices. The I/O interface 304 may include one or more I/O interfaces.

The communication interface 305 includes hardware, software, or both providing one or more interfaces for communication (such as, for example, packet-based communication) between the computing system 300 and one or more other computing systems or one or more networks. As an example and not by way of limitation, the communication interface 305 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 305 for it. As an example and not by way of limitation, the computing system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 300 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communication (GSM) network), or other suitable wireless network or a combination of two or more of these. The computing system 300 may include any suitable communication interface 305 for any of these networks, where appropriate. The communication interface 305 may include one or more communication interface 305.

The bus 306 interconnects various components of the computing system 300 thereby enabling the transmission of data and execution of various processes. The bus 306 may include one or more types of bus structures including a memory bus or memory controller, a peripheral bus, and a local bus using any of a variety of bus architectures.

Figure 4:
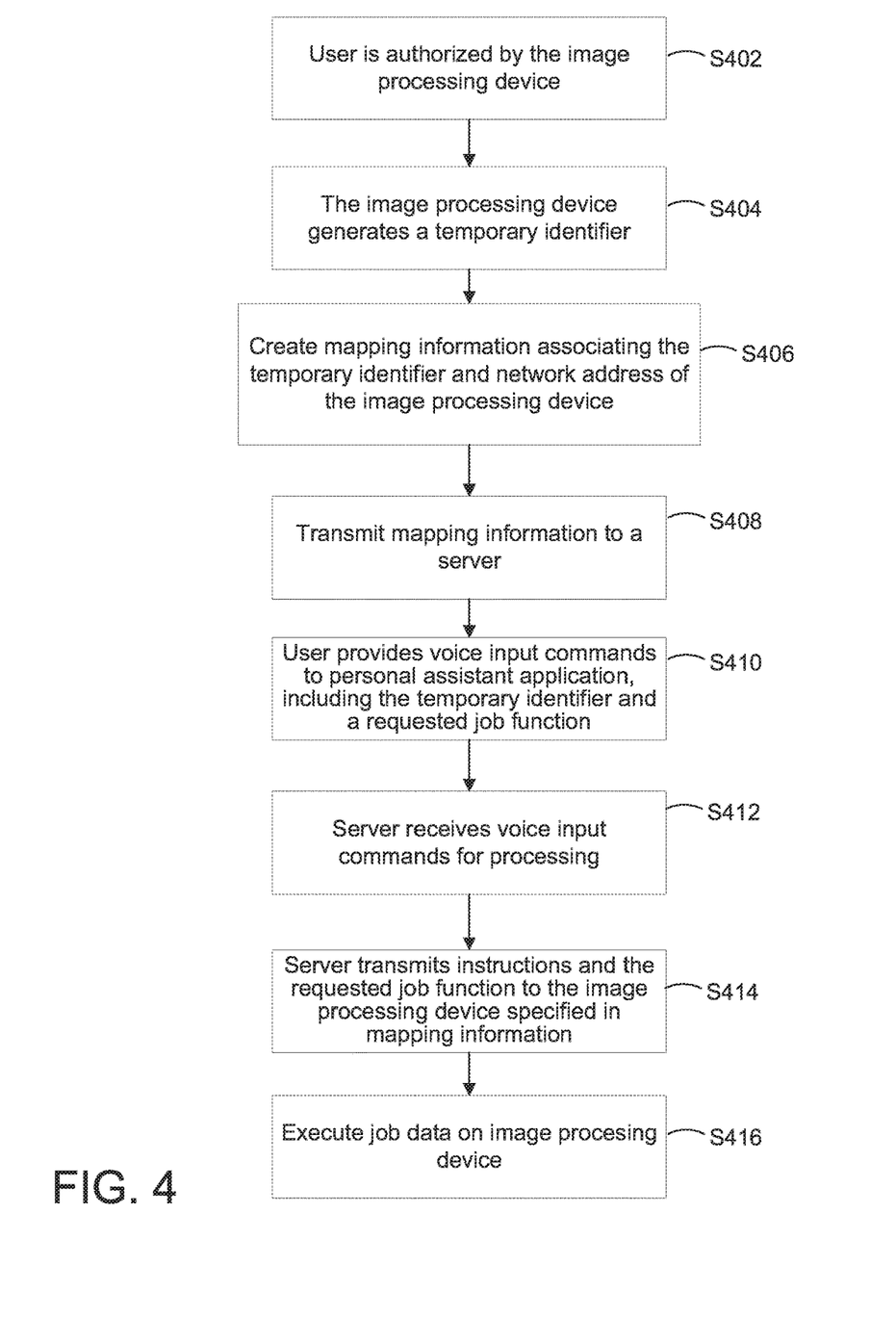
FIG. 4 illustrates exemplary flow diagrams setting forth various algorithms executed by computing devices used to implement verifying user proximity with a imaging processing device according to invention principles.

FIG. 4 represents a flow diagram detailing an exemplary operation used to implement verifying user proximity with an imaging processing device according to invention principles. In step S402, a user is authorized by the image processing device 110. The authentication may be based on a username and password, a smart card, a personal identification number (PIN), or other information associated with the user.

In step S404, an application 114 on the image processing device 110 detects the authorized user and generates a temporary identifier for the image processing device 110. The temporary identifier may be generated locally via an embedded dictionary of suitable words, or may be generated from an external source, such as server 120. The temporary identifier is displayed to the user in their native language.

In step S406, an application 114 on the image processing device 110 creates mapping information associating the generated temporary identifier and the current network address of the image processing device 110. In one embodiment, the mapping information is in JavaScript Object Notation (JSON) format and the network address used is the image processing device 110 IPv4 address or IPv6 address, though other addressing schemes may be used. When the network address of the image processing device is a network host name or alias, the IP address is to be resolved using a Domain Name System (DNS) protocol. The mapping information is stored as a key-value pair, the key being the temporary identifier and the value being the network address of the image processing device.

In step S408, the image processing device 110 uploads the mapping information to a server 120 and stores the received data in a memory or on a hard disk of the server 120. In one embodiment, the uploading of the mapping information uses Hyper Text Transfer Protocol Secure (HTTPS), but socket and other communication channels may be used.

In step S410, the user provides voice input commands to a personal assistant application. The voice input commands include the temporary identifier and a requested job function for the image processing device 110. The requested job function may also be referred to as job data. For example, if the generated temporary identifier is named "Walnut", they user would speak the voice input command of "Walnut, print my document." The personal assistant application would transcribe the spoken voice input command into text, and send the data to the server 120 for further processing, as in step S412. The server searches the received voice input command for the temporary identifier of the image processing device 110 to match the previously stored mapping information of the image processing device 110.

In step S414, the server 120 matches voice input command of the temporary identifier with the mapping information associating the generated temporary identifier and the current network address of the image processing device 110. When the match occurs, the requested job function is transmitted to the image processing device 110 at the specified network address. The requested job function may include but is not limited to type of job (print/scan/fax), finishing options (staple/hole punch), duplex options, document data, scan format options, uniform resource locator (URL) where document data can be downloaded, or other data types for the image processing device 110.

In step S416, the image processing device 110 receives the requested job function from the server 120 and executes the requested job function for the authorized user. When the authorized user logs out from the image processing device 110, the temporary identifier expires so that no unauthorized requested job functions can be executed.

In another embodiment, in order to authenticate a user of a voice-driven personal assistant application to an image processing device 110, the user's voice fingerprint is linked to the user's identity on the image processing device 110. The user's voice fingerprint is unique to other users, which makes it possible to analyze an audio recording of a voice, such as pitch, speed, and timbre, for features that will identify the user. Initially, the user is required to perform a one-time registration process before using the personal assistant application to communicate with the image processing device 110.

Figure 5:
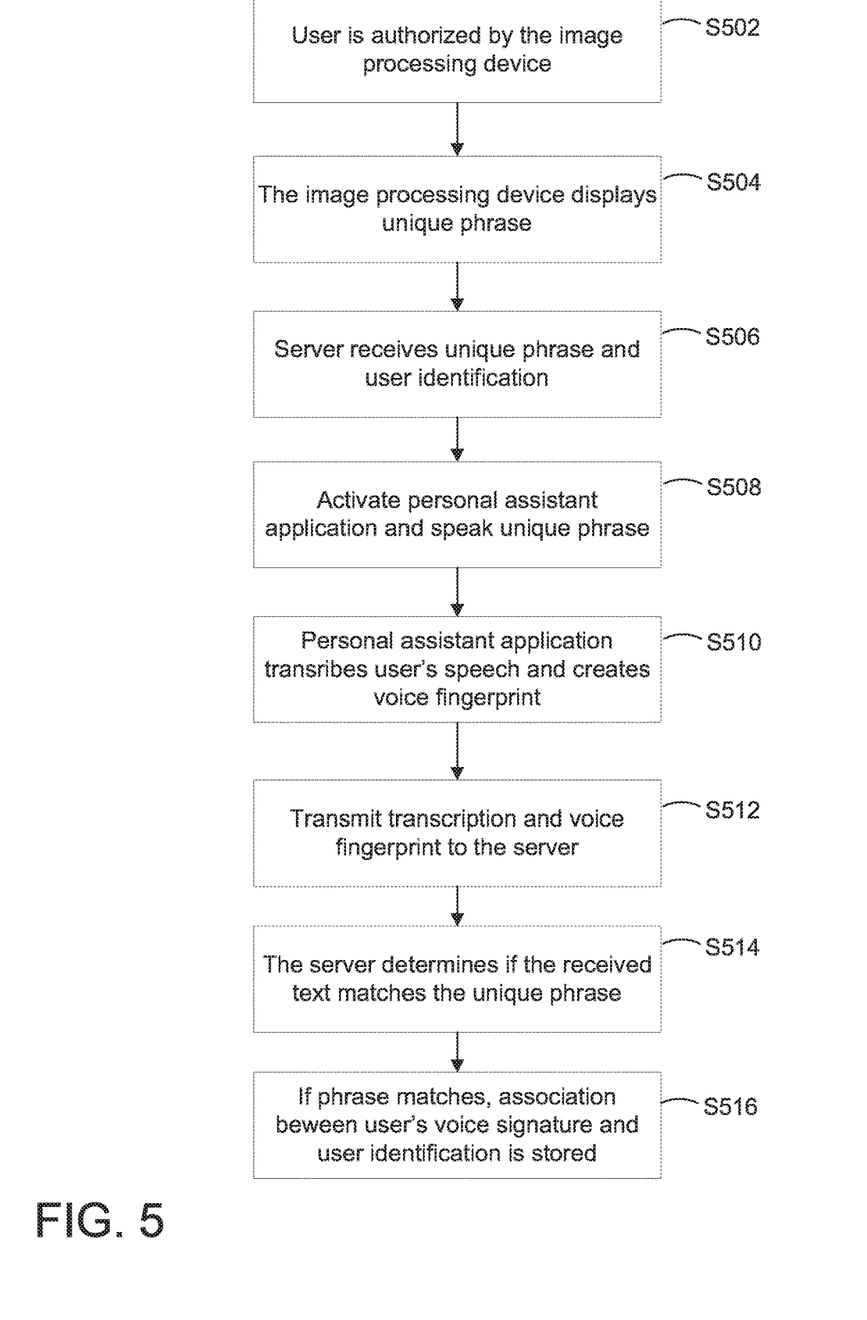
FIG. 5 illustrates exemplary flow diagrams setting forth various algorithms executed by computing devices used to implement registration process for authenticating user of a personal assistant platform to an image processing device according to invention principles.

FIG. 5 represents a flow diagram detailing an exemplary operation used to implement a one-time registration process for authenticating user of a personal assistant application to an image processing device 110. In step S502, a user is authorized by the image processing device 110. The authentication may be based on a username and password, a smart card, a personal identification number (PIN), or other information associated with the user.

In step S504, the image processing device 110 detects the authorized user and generates a unique phrase to be displayed to the user in their native language. The unique phrase may be generated locally via an embedded dictionary or may be generated from an external source, such as server 120. For example, in the English language, the unique phrase may read "The apples are ripe today." Since the unique phrase only appears after the user is authorized by the image processing device 110, knowledge of the unique phrase establishes that the user is physically present at the image processing device 110.

In step S506, the user may select the displayed unique phrase or choose from another generated unique phrase, and the image processing device 110 uploads to a server 120 the unique phrase and the user identification from being authorized by the image processing device 110. The server 120 stores the received data in a time-limited memory cache, to ensure that the registration process will naturally expire after a certain period of time, such as after 30 minutes.

In step S508, the user will activate the personal assistant application and speak the unique phrase that is displayed on the image processing device 110. In step S510, the personal assistant application transcribes the user's speech into text and also extracts voice features, such as pitch, speed, and timbre, and combines them into a voice fingerprint that can identify the user's voice. The transcription of the spoken unique phrase and the voice fingerprint are then uploaded to the server 120 as in step S512.

In step S514, an application 124 on the server 120 receives the transcription of the spoken unique phrase and the voice fingerprint. The application 124 on the server 120 will first determine if the transcription of the spoken unique phrase matches the unique phrase currently being displayed on the image processing device 110. In step S516, if the match is determined, an association between the voice fingerprint and user identification from being authorized by the image processing device 110 is created and stored on the server 120. The association between the voice fingerprint and user identification from being authorized by the image processing device 110 are later used to identify the user by means of his/her spoken voice. If the phrase does not match, an application 124 on the server 120 reports an error to the user by means of the personal assistant application.

Figure 6:
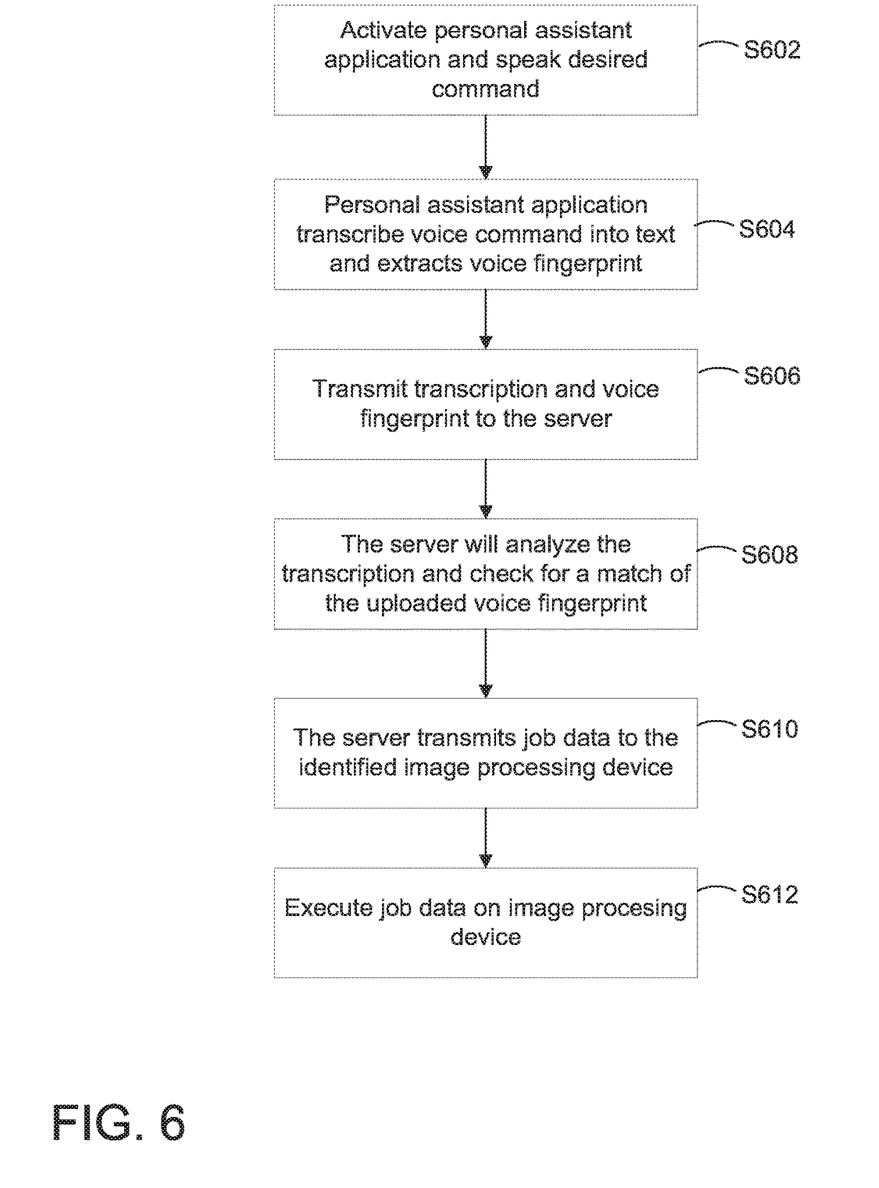
FIG. 6 illustrates exemplary flow diagrams setting for various algorithms executed by the computing devices used to implement authentication for a user of a personal assistant platform to an image processing device according to invention principles.

Having completed the one-time registration process as in FIG. 5, the user can now provide voice input commands to the personal assistant application to enable job functions on the image processing device 110. FIG. 6 represents a flow diagram detailing an exemplary operation used to implement authenticating user of a personal assistant application to an image processing device 110.

In step S602, the user will activate the personal assistant application and speak the desired voice input command for the image processing device 110. The form of the voice input command is dependent on the personal assistant application. In one embodiment, the user will have to identify the image processing device 110 by a name, usually a name assigned by the system administrator. In another embodiment, it may be possible to assign a default image processing device 110 to a particular user or department, so that identifying the image processing device 110 by name is not necessary. This will properly address sending job data to the correct image processing device 110.

In step S604, the personal assistant application receives the voice input command from the user. The personal assistant application will transcribe the voice input command into text and also will extract the voice fingerprint. The text transcription and the voice fingerprint are then uploaded to the server 120 as in step S606.

In step S608, an application 124 on the server 120 will analyze the text transcription to determine the type of job function that should be executed and which image processing device 110 the job data should be sent. The application 124 on the server 120 will then compare the received voice fingerprint to the voice fingerprint stored on the server 120, to determine a match of a previously registered user. If no match is found, an application 124 on the server 120 reports an error to the user by means of the personal assistant application. Otherwise, it retrieves the stored association that will match the voice fingerprint.

In step S610, after a match is found, the server transmits job data to the identified image processing device 110, as well as the user identification of the identified user. The image processing device 110 processes the received data and executes the job data for the authorized user, as in step S612.

In another embodiment, in order to establish the identity of a user of a voice-driven personal assistant application to an image processing device 110, the user identity on the personal assistant application is linked to a user identification on the image processing device 110 system, and also linked to a unique token wirelessly broadcasting from a mobile device 130. Initially, the user is required to perform a one-time registration process before using the personal assistant application to communicate with the image processing device 110.

Figure 7:
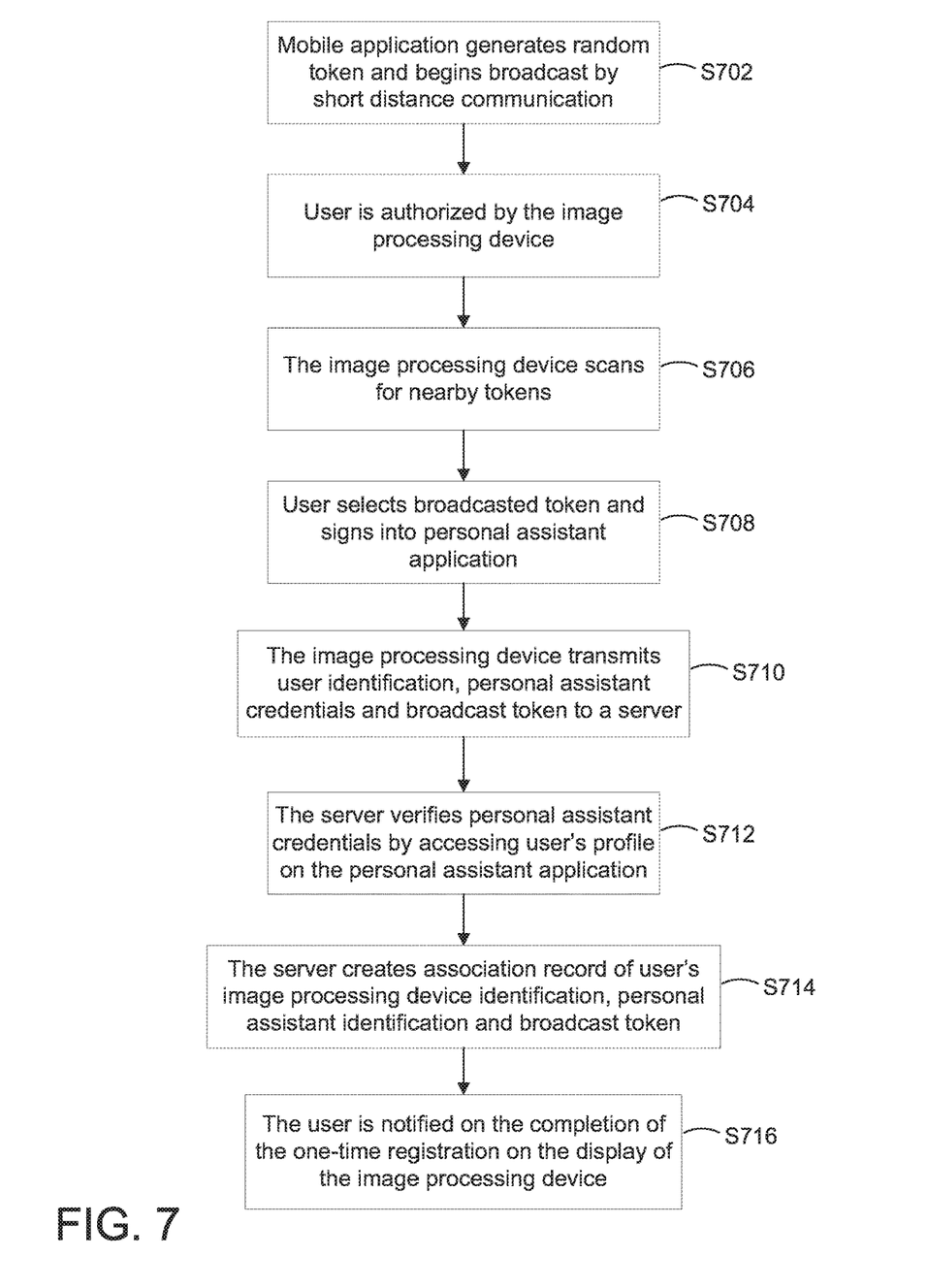
FIG. 7 illustrates exemplary flow diagrams setting forth various algorithms executed by computing devices used to implement the registration process for establishing the identity of a user on a personal assistant platform linked to an image processing device according to invention principles.

FIG. 7 represents a flow diagram detailing an exemplary operation used to implement a one-time registration process for establishing the identity of a user on a personal assistant platform linked to an image processing device 110. In step S702, a mobile device 130 will generate a random token and stored the random token in an internal storage. The mobile device 130 will begin broadcasting the token by using a short distance communication protocol.

In step S704, the user is authorized by the image processing device 110. The authentication may be based on a username and password, a smart card, a personal identification number (PIN), or other information associated with the user. An application 114 on the image processing device 110 scans for nearby token and will prompt the user to select a token currently being broadcast in the vicinity, as in step S706.

In step S708, the use selects the token matching the token that is being broadcast from the mobile device 130 and proceeds to sign into the personal assistant application on the image processing device 110, which may be done by providing the username and password to the personal assistant application. In another embodiment, a third-party federated authentication (OAuth) may be used where the user signs directly into the personal assistant application, and the image processing device 110 is granted an access token to the account. By either feature of using the username and password credentials, or through an access token, the image processing device 110 is able to authenticate with the personal assistant application.

At this point, the image processing device 110 possesses the user's identification on the image processing device 110, the user's credentials for the personal assistant application, and the user's broadcast token. The image processing device will upload the user's identification on the image processing device 110, the user's credentials for the personal assistant application, and the user's broadcast token to a server 120, as in step S710.

In step S712, after the server 120 receives the information from the image processing device 110, an application 124 on the server 120 will verify the user's credentials for the personal assistant application by attempting to access the user's profile information on the personal assistant application. This will verify that the user to be registered does have access to the personal assistant application. If the user's credentials with the personal assistant application are verified, the application 124 on the server 120 will create an association record with the user's identification on the image processing device 110, the user's credentials for the personal assistant application, and the user's broadcast token, as in step S714. The association record will be used to identify the user and is stored on the server 120.

In step S716, the user is notified on the completion of the one-time registration process on the display of the image processing device 110.

Figure 8:
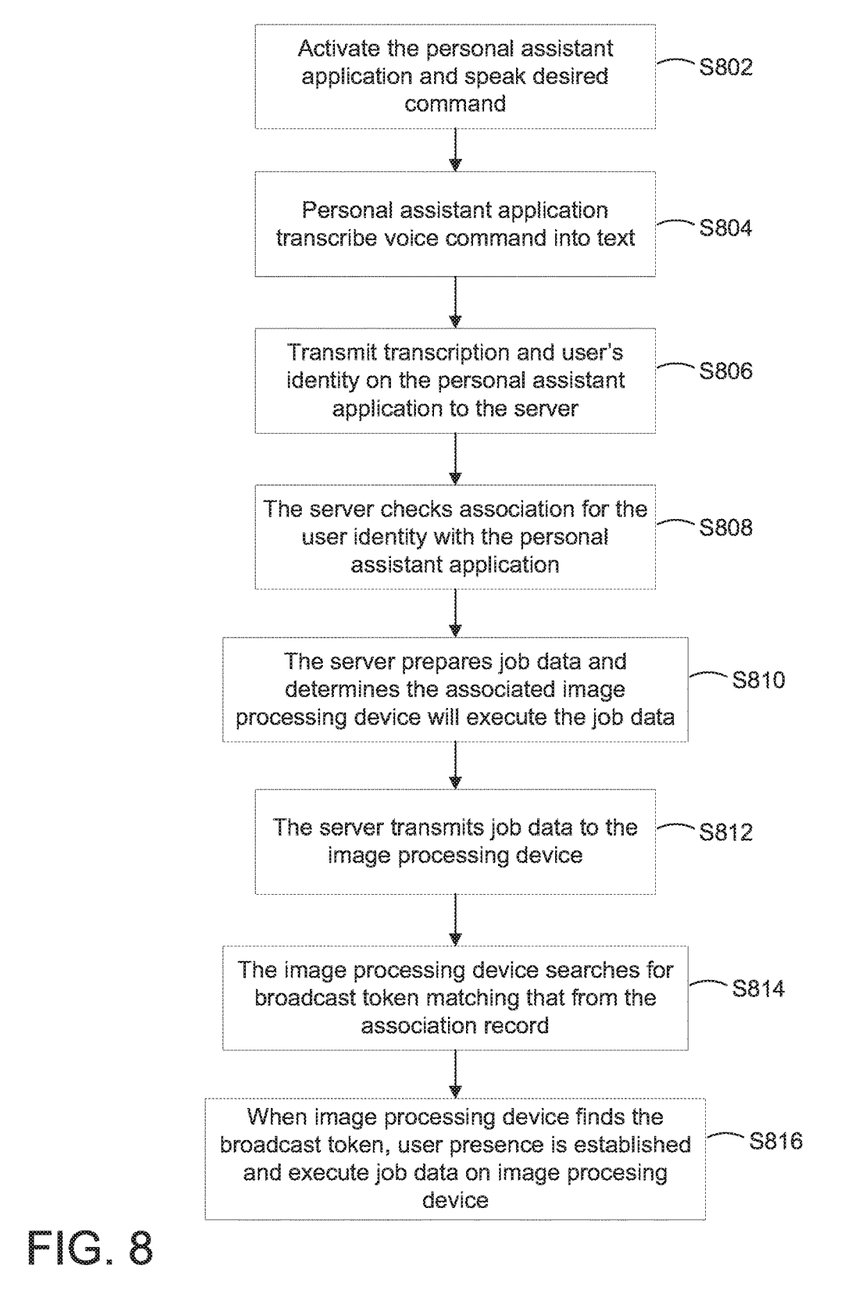
FIG. 8 illustrates exemplary flow diagrams setting forth various algorithms executed by computing devices used to implement establishing the identity of a user on a personal assistant platform linked to an image processing device according to invention principles.

Having completed the one-time registration process as in FIG. 7, the user can now provide voice input commands to the personal assistant application to enable job functions on the image processing device 110. FIG. 8 represents a flow diagram detailing an exemplary operation used to implement establishing the identity of a user on a personal assistant platform linked to an image processing device 110.

In step S802, the user will sign in and activate the personal assistant application and speak the desired voice input command for the image processing device 110. The form of the voice input command is dependent on the personal assistant application. In one embodiment, the user will have to identify the image processing device 110 by a name, usually a name assigned by the system administrator. In another embodiment, it may be possible to assign a default image processing device 110 to a particular user or department, so that identifying the image processing device 110 by name is not necessary. This will properly address sending job data to the correct image processing device 110.

In step S804, the personal assistant application receives the voice input command from the user. The personal assistant application will transcribe the voice input command into text. The text transcription and user's identity on the personal assistant application are then uploaded to the server 120 as in step S806.

In step S808, an application 124 on the server 120 will check for the stored association records that matches the received user identity of the personal assistant application. If no match is found, the application 124 on the server 120 reports an error to the user by means of the personal assistant application. Otherwise it will retrieve the association record for the identified user of that particular personal assistant application identity.

In step S810, after a match is found, the application 124 on the server 120 prepares job data and determines which image processing device 110 will execute the job data based from the stored association record. The server 120 transmits the job data, along with the identity of the user and the user's expected broadcast token, as determined from the association record, to the image processing device 110 as in step S812.

In step S814, the image processing device 110 will hold the job data in the internal memory and starts to scan for the user's broadcast token via short distance communication that matches that from the association record. When the image processing device 110 finds the user's broadcast token, where the broadcast is of sufficient signal strength to determine close proximity to the image processing device 110, the user's presence at the image processing device 110 is established and executes the job data for the authorized user, as in step S816.

The above description serves to explain principles of the invention, but the invention should not be limited to the examples described above. For example, the order and/or timing of some of the various operations may vary from the examples given above without departing from the scope of the invention. Further by way of example, the type of network and/or servers may vary from the examples given above without departing from the scope of the invention. Other variations from the above-recited examples may also exist without departing from the scope of the invention.

The scope of the present invention includes a non-transitory computer-readable storage medium storing instructions that, when executed by one or more processors, cause the one or more processors to perform one or more embodiments of the invention described herein. Examples of a computer-readable storage medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, A DVD-RW, A DVD+RW, magnetic tape, a nonvolatile memory card, and a ROM. Computer-executable instructions can also be supplied to the computer-readable storage mediums by being downloaded via a network.

While the present invention has been described with reference to exemplary embodiments, it is to be understood that the invention is not limited to the disclosed exemplary embodiments.

I claim:

1. A system for addressing a device and verifying user presence at an image processing device, the system comprising:
   a memory that stores a set of instructions;
   at least one processor that is in communication with the memory, the processor executes the instructions of:
   accessing an image processing device by an authorized user;
   assigning a temporary identifier to the image processing device;
   creating mapping information that associates the authorized user, the temporary identifier and a network address of the image processing device;
   transmitting the mapping information to a server for storage and processing;
   providing voice input commands to a personal assistant application, the voice input commands including the temporary identifier of the image processing device and a requested job functions of the image processing device;
   receiving the voice input commands from the personal assistant application to the server, the server interpreting the voice input commands and determining, by recalling the mapping information stored on the server, whether the image processing device having the temporary identifier is available to perform the requested job functions;
   transmitting the instructions to perform the requested job functions to the address of the image processing device, as specified in the mapping information, and executing the requested job functions on the image processing device.

2. The system according to claim 1, wherein the temporary identifier is chosen based on the user's native language and is used to identify the image processing device in subsequent voice input commands.

3. The system according to claim 1, wherein the temporary identifier may be selected locally by an embedded dictionary or may be requested from an external network server.

4. The system according to claim 1, wherein the network address of the image processing device associated with the temporary identifier is an IPv4 address or IPv6 address.

5. The system according to claim 1, wherein the network address of the image processing device is a network host name or alias, the IP address is resolved using a DNS protocol.

6. The system according to claim 1, wherein the mapping information is stored as a key-value pair, the key being the temporary identifier and the value being the network address of the image processing device.

7. The system according to claim 1, wherein the authorized user logs out from the image processing device, the temporary identifier expires and can no longer be used to execute the requested job functions on the image processing device.

8. A method for addressing a device and verifying user presence at an image processing device, the method comprising:
   accessing an image processing device by an authorized user;
   assigning a temporary identifier to the image processing device;
   creating mapping information that associates the authorized user, the temporary identifier and a network address of the image processing device;
   transmitting the mapping information to a server for storage and processing;
   providing voice input commands to a personal assistant application, the voice input commands including the temporary identifier of the image processing device and a requested job functions of the image processing device;
   receiving the voice input commands from the personal assistant application to the server, the server interpreting the voice input commands and determining, by recalling the mapping information stored on the server, whether the image processing device having the temporary identifier is available to perform the requested job functions;
   transmitting the instructions to perform the requested job functions to the address of the image processing device, as specified in the mapping information, and executing the requested job functions on the image processing device.

9. The method according to claim 8, wherein the temporary identifier is chosen based on the user's native language and is used to identify the image processing device in subsequent voice input commands.

10. The method according to claim 8, wherein the temporary identifier may be selected locally by an embedded dictionary or may be requested from an external network server.

11. The method according to claim 8, wherein the network address of the image processing device associated with the temporary identifier is an IPv4 address or IPv6 address.

12. The method according to claim 8, wherein the network address of the image processing device is a network host name or alias, the IP address is resolved using a DNS protocol.

13. The method according to claim 8, wherein the mapping information is stored as a key-value pair, the key being the temporary identifier and the value being the network address of the image processing device.

14. The method according to claim 8, wherein the authorized user logs out from the image processing device, the temporary identifier expires and can no longer be used to execute the requested job functions on the image processing device.

15. A non-transitory computer-readable storage medium storing instructions that, when executed by one or more processors, cause the one or more processors to perform operations comprising:
   accessing an image processing device by an authorized user;
   assigning a temporary identifier to the image processing device;
   creating mapping information that associates the authorized user, the temporary identifier and a network address of the image processing device;
   transmitting the mapping information to a server for storage and processing;
   providing voice input commands to a personal assistant application, the voice input commands including the temporary identifier of the image processing device and a requested job functions of the image processing device;
   receiving the voice input commands from the personal assistant application to the server, the server interpreting the voice input commands and determining, by recalling the mapping information stored on the server, whether the image processing device having the temporary identifier is available to perform the requested job functions;
   transmitting the instructions to perform the requested job functions to the address of the image processing device, as specified in the mapping information, and executing the requested job functions on the image processing device.

* * * * *